US012680902B2

(12) United States Patent
Tice et al.

(10) Patent No.: US 12,680,902 B2
(45) Date of Patent: Jul. 14, 2026

(54) SYSTEMS AND METHODS FOR DETECTING REFRIGERANT LEAKS IN HEATING, VENTILATING, AND AIR CONDITIONING (HVAC) SYSTEMS

(71) Applicant: Johnson Controls Technology Company, Auburn Hills, MI (US)

(72) Inventors: Steven A. Tice, Wichita, KS (US); William F. McQuade, New Cumberland, PA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 1265 days.

(21) Appl. No.: 15/871,704

(22) Filed: Jan. 15, 2018

(65) Prior Publication Data

US 2019/0170600 A1 Jun. 6, 2019

Related U.S. Application Data

(60) Provisional application No. 62/593,597, filed on Dec. 1, 2017.

(51) Int. Cl.
| | |
|---|---|
| *G01M 3/16* | (2006.01) |
| *F25B 49/00* | (2006.01) |
| *G01M 3/00* | (2006.01) |
| *G01M 3/28* | (2006.01) |

(52) U.S. Cl.
CPC ............. *G01M 3/16* (2013.01); *F25B 49/005* (2013.01); *G01M 3/002* (2013.01); *G01M 3/2815* (2013.01); *F25B 2500/222* (2013.01)

(58) Field of Classification Search
CPC ............ F25B 2500/22; F25B 2500/221; F25B 2500/23; F25B 2500/24; F25B 2500/32; F25B 2500/222; G01M 3/007
See application file for complete search history.

(56) References Cited

U.S. PATENT DOCUMENTS

| | | | | | |
|---|---|---|---|---|---|
| 4,286,435 | A | * | 9/1981 | Cann | ...................... F25B 47/022 62/81 |
| 5,457,965 | A | * | 10/1995 | Blair | ........................ G01F 23/14 62/228.3 |
| 6,336,353 | B2 | | 1/2002 | Matsiev et al. | |

(Continued)

FOREIGN PATENT DOCUMENTS

| | | | | | |
|---|---|---|---|---|---|
| CN | | 202057136 U | * | 11/2011 | ............. F25D 21/12 |

OTHER PUBLICATIONS

TE Connectivity Ltd; FPS2800B12C4 Fluid Property Senor; pp. 1-5; 2015.

*Primary Examiner* — Jianying C Atkisson
*Assistant Examiner* — Meraj A Shaikh
(74) *Attorney, Agent, or Firm* — Fletcher Yoder, P.C.

(57) ABSTRACT

The present disclosure relates to a refrigerant leak detection and mitigation system of a heating, ventilating, and air conditioning (HVAC) unit. The refrigerant leak detection and mitigation system includes a controller configured to determine a plurality of parameters correlated to refrigerant leak conditions based on data from a plurality of sensors. The controller is also configured to determine a probability of a refrigerant leak in the HVAC unit based on the plurality of parameters. Additionally, the controller is configured to provide a control signal to modify operation of the HVAC unit in response to comparison of the probability with a threshold value.

35 Claims, 7 Drawing Sheets

(56)        References Cited

U.S. PATENT DOCUMENTS

| | | | |
|---|---|---|---|
| 6,494,079 B1 | 12/2002 | Matsiev et al. | |
| 6,873,916 B2 | 3/2005 | Kolosov et al. | |
| 6,957,565 B2 | 10/2005 | Matsiev et al. | |
| 7,043,969 B2 | 5/2006 | Matsiev et al. | |
| 7,975,498 B2 | 7/2011 | Shah et al. | |
| 9,366,451 B2 | 6/2016 | Guo et al. | |
| 9,696,056 B1 | 7/2017 | Rosenberg | |
| 2001/0045129 A1* | 11/2001 | Williams | G01M 3/24 |
| | | | 73/592 |
| 2003/0055603 A1* | 3/2003 | Rossi | F25B 49/02 |
| | | | 702/185 |
| 2007/0156373 A1* | 7/2007 | Yamashita | F24F 11/38 |
| | | | 702/182 |
| 2010/0154447 A1* | 6/2010 | Yoshimi | F25B 49/005 |
| | | | 62/149 |
| 2016/0025403 A1* | 1/2016 | Krainer | F25D 21/02 |
| | | | 62/81 |
| 2016/0153697 A1* | 6/2016 | Hamamoto | F25B 41/39 |
| | | | 62/160 |
| 2016/0203036 A1 | 7/2016 | Mezic et al. | |
| 2017/0016797 A1* | 1/2017 | Park | G01N 29/4472 |
| 2017/0198953 A1 | 7/2017 | Connell et al. | |
| 2017/0292744 A1* | 10/2017 | Suzuki | F24F 13/15 |
| 2018/0073762 A1* | 3/2018 | Yajima | F24F 11/89 |
| 2018/0340719 A1* | 11/2018 | Rona | F25B 49/02 |
| 2020/0011580 A1* | 1/2020 | Matsuda | F25B 49/02 |
| 2020/0049361 A1* | 2/2020 | Minamida | F25B 49/02 |
| 2020/0049384 A1* | 2/2020 | Asanuma | F25B 49/005 |

* cited by examiner

SYSTEMS AND METHODS FOR DETECTING REFRIGERANT LEAKS IN HEATING, VENTILATING, AND AIR CONDITIONING (HVAC) SYSTEMS

CROSS-REFERENCE TO RELATED APPLICATION

This application is a Non-Provisional application claiming priority to U.S. Provisional Application No. 62/593,597, entitled "SYSTEMS AND METHODS FOR DETERMINING REFRIGERANT LEAKS IN HEATING, VENTILATING, AND AIR CONDITIONING (HVAC) SYSTEMS," filed Dec. 1, 2017, which is hereby incorporated by reference in its entirety for all purposes.

BACKGROUND

The present disclosure relates generally to heating, ventilating, and air conditioning (HVAC) systems, and more particularly to refrigerant leak detection for HVAC systems.

A wide range of applications exist for HVAC systems. For example, residential, light commercial, commercial, and industrial HVAC systems are used to control temperatures and air quality in residences and other structures. Certain HVAC units can be dedicated to either heating or cooling, although many HVAC units are capable of performing both functions. In general, HVAC systems operate by implementing a thermal cycle in which a refrigerant undergoes alternating phase changes within a refrigeration circuit to remove heat from or deliver heat to a conditioned interior space of a structure. Similar systems are used for vehicle heating and cooling, and as well as for other types of general refrigeration, such as refrigerators, freezers, and chillers.

The refrigerant of a HVAC system may be operated at pressures greater than atmospheric pressure. As such, when a portion of the refrigeration circuit of a HVAC system is damaged, this refrigerant may leak from the refrigeration circuit. Inasmuch as refrigerant leaks compromise system performance or result in increased operating and/or maintenance costs, it is accordingly desirable to provide detection and response systems and methods for the HVAC system to reliably detect and respond to any refrigerant leaks of the HVAC system.

SUMMARY

The present disclosure relates to a refrigerant leak detection and mitigation system of a heating, ventilating, and air conditioning (HVAC) unit. The refrigerant leak detection and mitigation system includes a controller configured to determine a plurality of parameters correlated to refrigerant leak conditions based on data from a plurality of sensors. The controller is also configured to determine a probability of a refrigerant leak in the HVAC unit based on the plurality of parameters. Additionally, the controller is configured to provide a control signal to modify operation of the HVAC unit in response to comparison of the probability with a threshold value.

The present disclosure also relates to a heating, ventilating, and air conditioning (HVAC) system having a condenser, an expansion device, an evaporator, and a compressor fluidly coupled to form a vapor compression system. The HVAC system includes a refrigerant leak detection and mitigation system that includes icing sensors, subcooling sensors, and superheat sensors communicatively coupled to a controller. The controller is configured to determine an amount of icing, an amount of subcooling, and an amount of superheat based on measurements from the icing, subcooling, and superheat sensors, respectively. The controller is also configured to determine a probability of a refrigerant leak in the vapor compression system based on at least two of the determined amount of icing, subcooling, and superheat. Furthermore, the controller is configured to provide a control signal to modify operation of the HVAC system in response to results of comparing the probability to a threshold value.

The present disclosure further relates to a heating, ventilating, and air conditioning (HVAC) system having a condenser, an expansion device, an evaporator, and a compressor fluidly coupled to form a vapor compression system. The HVAC system includes a refrigerant leak detection and mitigation system that includes icing sensors, subcooling sensors, and superheat sensors communicatively coupled to a controller. The controller is configured to determine an amount of icing, an amount of subcooling, and an amount of superheat based on measurements from the icing, subcooling, and superheat sensors, respectively. The controller is also configured to determine a probability of a refrigerant leak in the vapor compression system based on the determined amount of icing, subcooling, and superheat. Furthermore, the controller is configured to provide a control signal to modify operation of the HVAC system in response to results of comparing the probability to a threshold value.

DETAILED DESCRIPTION

The present disclosure is generally directed to a refrigerant leak detection and management system that is capable of detecting and addressing refrigerant leaks in a vapor compression system, such as a vapor compression system of an HVAC system. As set forth below, the disclosed system includes a number of sensors that monitor particular conditions or parameters of the vapor compression system that are presently recognized to be correlated to indirect indications of a refrigerant leak. As discussed, these conditions or parameters include: whether icing is occurring on an evaporator of the vapor compression system, whether subcooling is insufficient or not occurring in the vapor compression system, and whether an undesirable amount of superheat is present in the vapor compression system. The disclosed system includes a controller capable of determining the probability that a refrigerant leak exists, or will exist at a future time, based on each of the monitored conditions of the vapor compression system. When the probability of a refrigerant leak exceeds one or more predetermined threshold values, the controller may modify operation of the HVAC system to mitigate the refrigerant leak. For instance, the controller may send signals to open a damper or activate a fan of the HVAC system to dissipate leaked refrigerant from the HVAC system. Accordingly, the presently disclosed system effectively determines or predicts whether a refrigerant leak exists, or will exist at a future time, without directly detecting the leaked refrigerant itself. In this manner, the disclosed techniques enable indirect detection of refrigerant leaks within the HVAC system, and further enables response via any combination of suitable control actions that address the leaked refrigerant.

Figure 1:
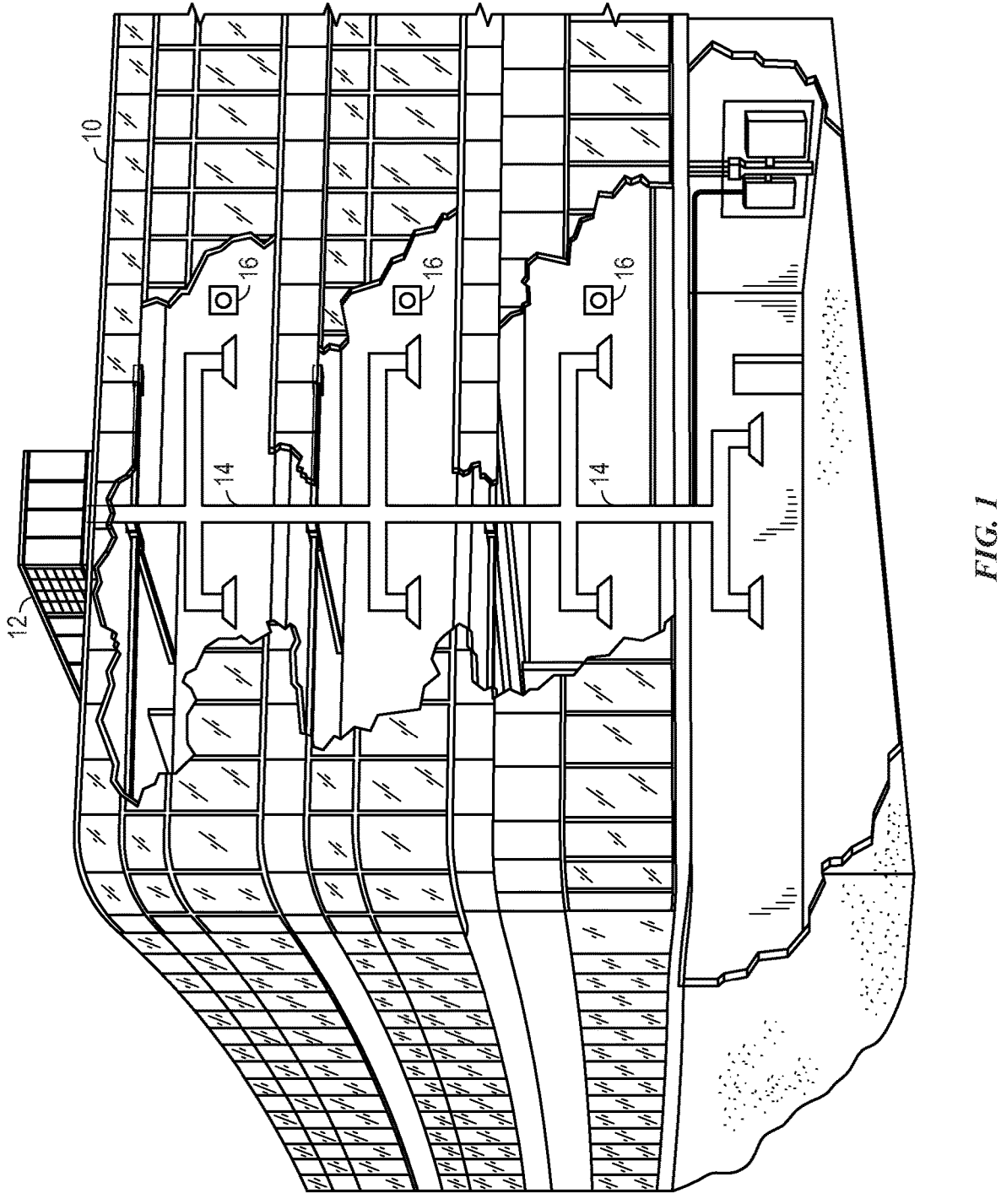
FIG. 1 is a perspective view a commercial heating, ventilating, and air conditioning (HVAC) system for building environmental management, in accordance with embodiments described herein.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
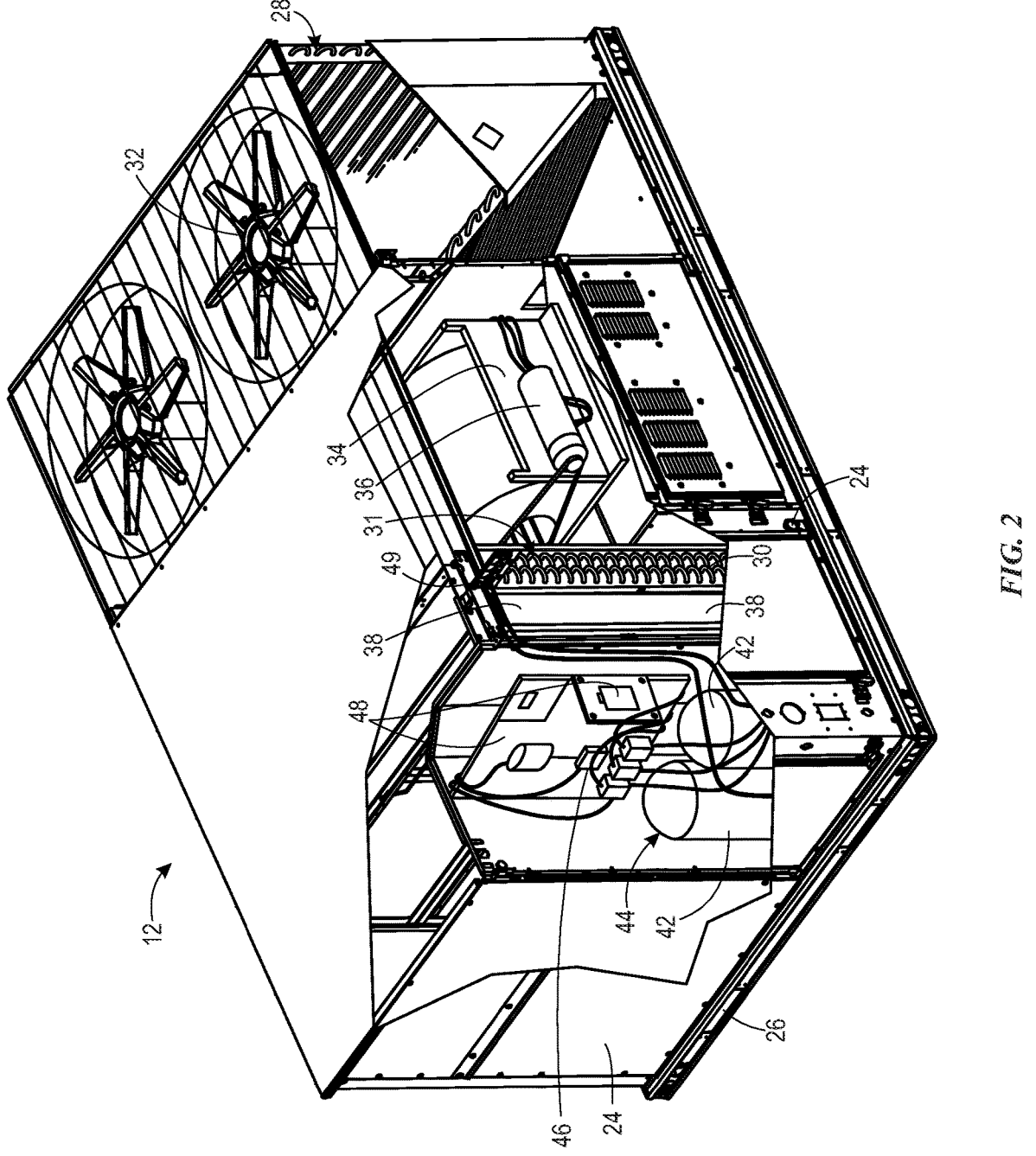
FIG. 2 is a perspective view of a single package HVAC unit of the HVAC system illustrated in FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
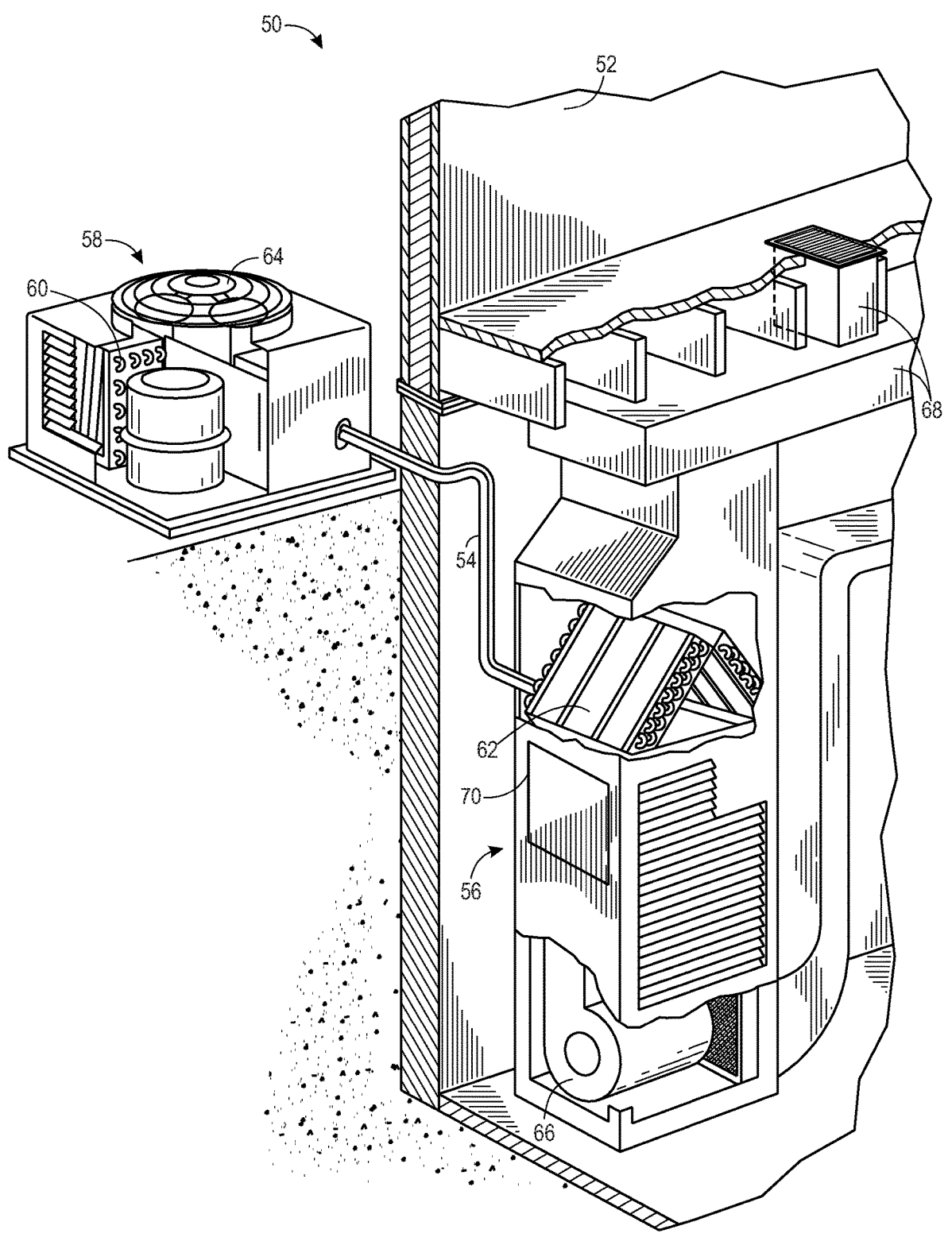
FIG. 3 is a perspective view of a residential HVAC system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
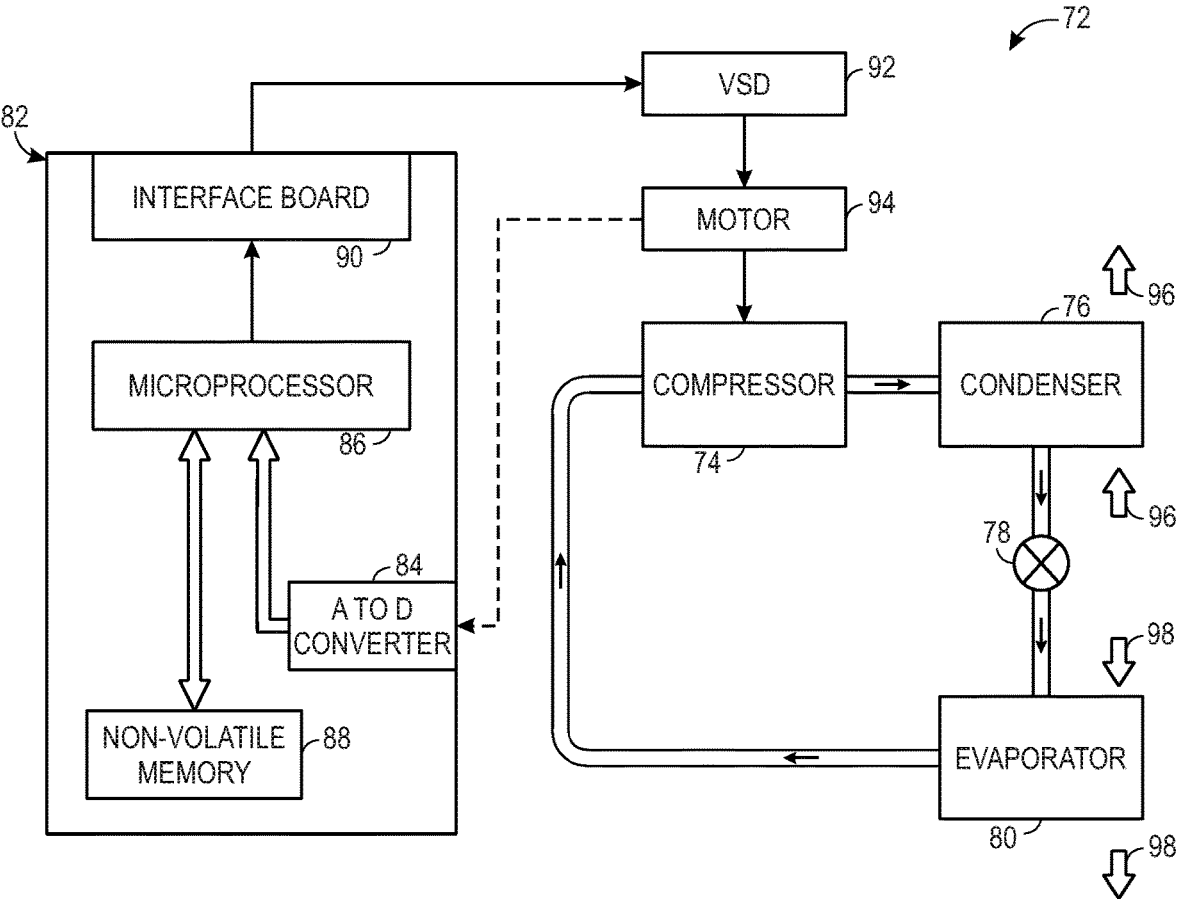
FIG. 4 is a schematic diagram of a vapor compression system that may be used in the commercial HVAC system of FIG. 1 and the residential HVAC system of FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. Each of the illustrated components, such as the microprocessor or processor 86, may be representative of multiple such components. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, the HVAC unit 12 includes refrigerant that is used to condition air before the conditioned air is sent to a conditioned space, such as a conditioned interior space of building 10. In certain embodiments, the refrigerant may include R-32, R-452B, R-134A, R-447A, R-455A, R-32, R-1234ze, R-1234yf, R-454A, R-454C, or R-454B, or any other suitable refrigerant. Under certain circumstances, the refrigerant may inadvertently leak from a component or a flow path of the vapor compression system 72, also referred to herein as the refrigeration circuit, due to wear or damage to components, or faulty joints or connections within the circuit. The present techniques enable the HVAC system to reliably detect and manage the leak of refrigerant from the vapor compression circuit. The present techniques also enable the HVAC system to reliably predict the occurrence of a refrigerant leak.

As discussed below with respect to FIG. 5, a processor of a controller, such as processor 86 control panel 78, may utilize a profile stored in memory 88, or stored in an accessible remote electronic device, to determine whether a refrigerant leak exists or predict whether a future refrigerant leak will exist. In response, the processor 86 may perform various control actions to mitigate the refrigerant leak. In certain embodiments, a probability or likelihood of a refrigerant leak existing may be determined, and various control actions may be performed based on the probability of the refrigerant leak existing. While the discussion herein relates to the HVAC unit 12, it should be noted that different types of HVAC units or systems may be used instead. That is, the discussion above it not limited to single package HVAC units and/or commercial or industrial HVAC systems, such as those illustrated in FIGS. 1 and 2. For example, the techniques discussed herein may be implemented in the residential heating and cooling system 50 of FIG. 3.

Figure 5:
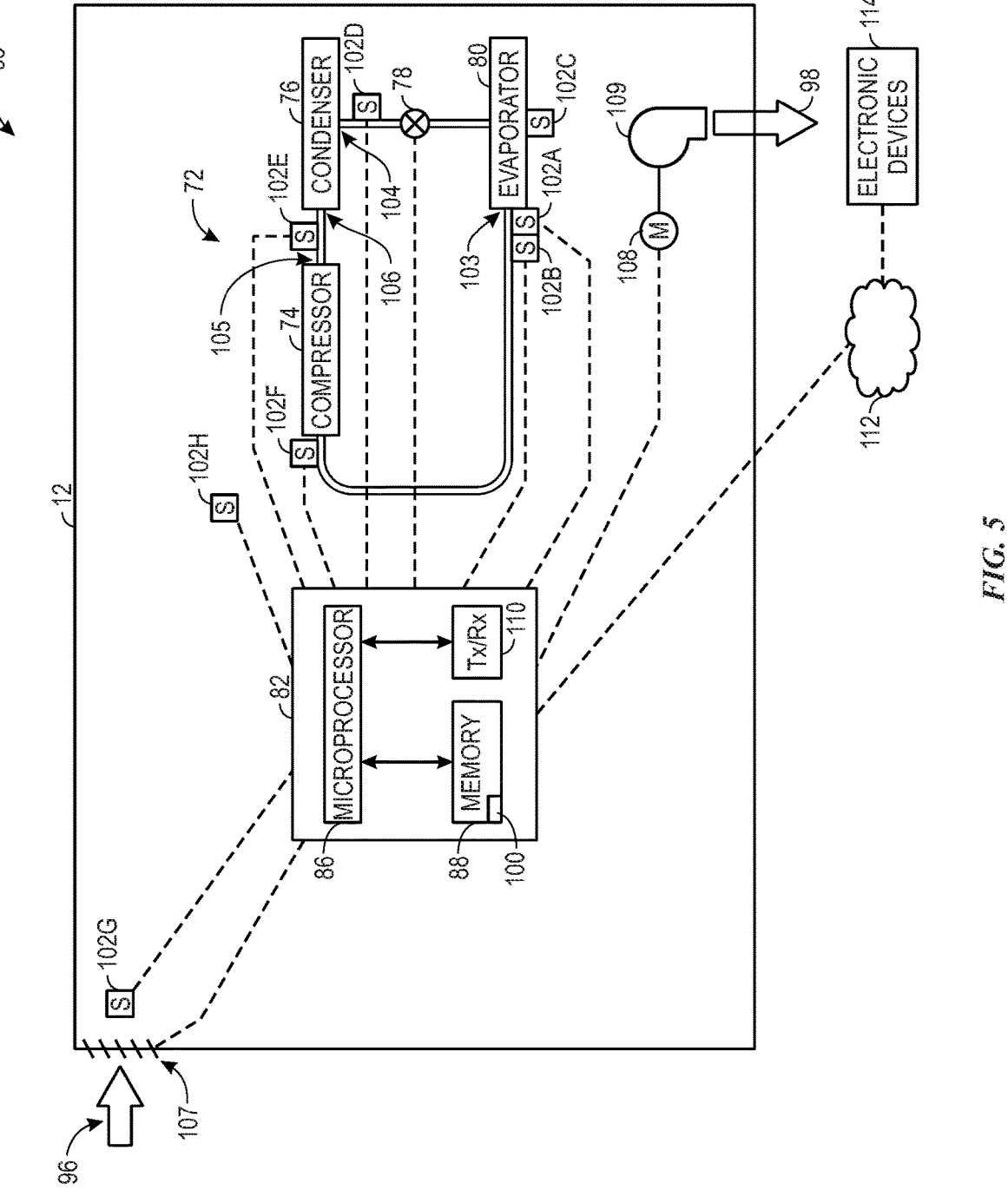
FIG. 5 is a schematic diagram of the single package HVAC unit of FIG. 2, in accordance with embodiments described herein.

With the foregoing discussion in mind, FIG. 5 is a schematic diagram of an embodiment of the HVAC unit 12 that includes a refrigerant leak detection and mitigation system 99, in accordance with the present technique. As illustrated and discussed above, the HVAC unit 12 includes the vapor compression system 72, as well as the control panel 82 that controls operation of the HVAC unit 12. More specifically, processor 86 of the control panel 82 may execute instructions stored on the memory 88 to control the HVAC unit 12. In certain embodiments, the memory 88 stores a profile 100 that includes information, such as instructions or data, for determining a probability of a refrigerant leak existing, as well as information relating to control actions to be performed based on the determined probability of a refrigerant leak existing.

The embodiment of the refrigerant leak detection and mitigation system 99 illustrated in FIG. 5 includes one or more sensors 102 positioned on or about various components of the vapor compression system 72. The sensors 102 are communicatively coupled to the processor 86 of the control panel 82, and the processor 86 may execute instructions to receive one or more signals from the sensors 102. The signals may include data signals and measurement signals. The sensors 102 may collect data regarding various characteristics of the vapor compression system 72, including data regarding particular components of the vapor compression system 72 and/or the data regarding refrigerant at particular points in the vapor compression system 72.

Certain sensors 102 of the embodiment of the refrigerant leak detection and mitigation system 99 illustrated in FIG. 5 may be used to determine whether ice, such as water ice from moisture in the air, is forming at the surface of the evaporator 80. That is, as mentioned, it is presently recognized that evaporator icing is a vapor compression system condition that may occur as the result of a refrigeration leak. As such, one or more sensors 102 of the refrigerant leak detection and mitigation system 99 may be used to indirectly or directly measure indications of evaporator icing.

For example, in the embodiment illustrated in FIG. 5, a temperature sensor 102A and a pressure sensor 102B are positioned at a refrigerant outlet 103 of the evaporator 80, which may be used by the processor 86 to indirectly determine a probability the evaporator icing is occurring or will occur in the near future. The temperature sensor 102A sends signals to the processor 86 indicating a temperature of refrigerant exiting the evaporator 80. Similarly, the pressure sensor 102B sends signals to the processor 86 indicating a pressure of the refrigerant leaving the evaporator 80. Using the respective signals from sensor 102A and 102B, the processor 86 determines a temperature and pressure of refrigerant exiting the evaporator 80. In some embodiments, a single sensor may be used to collect data regarding the temperature and pressure of refrigerant exiting evaporator 80. For instance, the sensor may be a combination pressure and temperature sensor.

As such, in certain embodiments, based on the determined temperature and pressure of refrigerant exiting the evaporator 80, the processor 86 may determine a probability that evaporator icing has occurred, is occurring, or will occur in the near future. For example, the processor 86 may determine the probability of evaporator icing by utilizing a look-up table stored in the memory 88 that defines a relationship between the probability of icing and the temperature and/or pressure of the refrigerant at the outlet 103 of the evaporator 80. The look-up table may be based on physical properties of the refrigerant, such as a saturation point or quantity of the refrigerant. Additionally, the data contained in the look-up table may be experimentally determined by simulating refrigerant leaks in the vapor compression system 72 while monitoring the temperature and/or pressure of the refrigerant at the outlet 103 of the evaporator 80 and visually inspecting for evaporator icing.

Additionally or alternatively, other types of sensors 102 may be used to directly detect or measure evaporator icing, in certain embodiments. For example, the embodiment of the refrigerant leak detection and mitigation system 99 illustrated in FIG. 5 includes an ice sensor 102C that directly detects and/or measures a level of evaporator icing. The ice sensor 102C is communicatively coupled to the processor 86 of the control panel 82 and sends signals to the processor 86 regarding icing of the evaporator 80. For example, the sensor 102C may be disposed on the outer surface of the evaporator 80 or on a coil of the evaporator 80 provide signals indicating that ice is present and/or a relative amount of ice that is present. Based on signals from the sensor 102C, the processor 86 may determine the degree of icing occurring on the evaporator 80. That is, the sensor 102C may not only detect the presence of ice, but also detect an amount of ice formed at the surface of the evaporator. In some embodiments, the sensor 102C may not be included. In such embodiments, the processor 86 may determine a probability of ice being present on the evaporator based on pressure sensed via the pressure sensor 102B and/or temperature measurements obtained via the temperature sensor 102A.

Certain sensors 102 of the embodiment of the refrigerant leak detection and mitigation system 99 illustrated in FIG. 5 may be used to determine whether subcooling within the vapor compression system 72 has diminished or disappeared. Subcooling refers to a degree or an amount that a liquid refrigerant temperature is below the boiling point of the refrigerant. It is presently recognized that a loss of subcooling is a vapor compression system condition that may occur as the result of a refrigeration leak. As such, one or more sensors 102 of the refrigerant leak detection and mitigation system 99 may be used to indirectly or directly measure indications of subcooling loss.

For example, the embodiment of the refrigerant leak detection and mitigation system 99 illustrated in FIG. 5 includes a temperature sensor 102D disposed downstream from the condenser 76 in the vapor compression system 72. More specifically, for the illustrated embodiment, the temperature sensor 102D is located at an outlet 104 of the condenser 76 to measure the temperature of refrigerant exiting the condenser 76. The sensor 102D is communicatively coupled to the processor 86 and sends signals to the processor 86 indicative of the temperature of the refrigerant.

In some embodiments, the sensor 102D may also detect a pressure of the refrigerant exiting the condenser 76. Also, the sensor 102D may be disposed in any suitable location between the condenser 76 and the expansion valve 78.

Based on the signals received from the sensor 102D, the processor 86 calculates subcooling of the refrigerant in the vapor compression system 72. The processor 86 may determine whether subcooling is occurring and/or a degree of subcooling by utilizing a look-up table stored in the memory 88 that defines a relationship between a degree or amount of subcooling and the temperature and/or pressure of the refrigerant at the outlet 104 of the condenser 76. The look-up table may be based on physical properties of the refrigerant, such as a boiling point of the refrigerant. As another example, the processor 86 may determine subcooling exists when a temperature of the refrigerant is below the boiling point of the refrigerant, and the processor 86 may determine an amount of subcooling by determining the extent to which the temperature of the refrigerant is below the boiling point of the refrigerant. Similar to icing of the evaporator 80, the processor 86 may also be able to determine a probability of subcooling occurring or not occurring, or predict whether the subcooling will decrease in the near future. Such a determination may be made based on subcooling trends over time.

Certain sensors 102 of the embodiment of the refrigerant leak detection and mitigation system 99 illustrated in FIG. 5 may be used to determine whether superheat within the vapor compression system 72 has increased. Superheat generally refers to a degree or amount that the temperature of refrigerant vapor is above a saturation temperature of the refrigerant at a particular pressure. Moreover, superheat may include discharge superheat and/or suction superheat. Discharge superheat generally refers to superheat that is determined based on measurements of the refrigerant downstream of the compressor 74, while suction superheat generally refers to superheat that is determined based on measurements of the refrigerant upstream of the compressor 74. As mentioned, it is presently recognized that an increase in superheat is a vapor compression system condition that may occur as the result of a refrigeration leak. As such, one or more sensors 102 of the refrigerant leak detection and mitigation system 99 may be used to indirectly or directly measure indications of increasing superheat.

For example, the embodiment of the refrigerant leak detection and mitigation system 99 illustrated in FIG. 5 includes a combined pressure and temperature sensor 102E disposed downstream from the compressor 74 in the vapor compression system 72. More specifically, for the illustrated embodiment, the sensor 102E is located at the outlet 105 of the compressor 74 to measure the temperature and pressure of refrigerant as the refrigerant exits the compressor 74. In other embodiments, the sensor 102E may be disposed in any suitable location between the compressor 74 and the condenser 76, at the outlet 105 of the compressor 74, or at the inlet 106 of the condenser 76.

The sensor 102E is communicatively coupled to the processor 86 and sends signals to the processor 86 regarding a temperature and pressure of the refrigerant exiting the compressor 74. Based on the signals from the sensor 102E, the processor 86 determines a discharge superheat of refrigerant exiting the compressor 74. For instance, the processor 86 may determine the discharge superheat by utilizing a look-up table stored in the memory 88 that defines a relationship between an amount or degree of discharge superheat and the temperature and pressure of the refrigerant at the outlet 105 of the compressor 74. The look-up table may be based on physical properties of the refrigerant, such as a saturation point and/or quantity of the refrigerant.

In other embodiments, the refrigerant leak detection and mitigation system 99 may include a sensor 102F disposed upstream of the compressor 74 in alternative to, or in addition to, the sensor 102E. The sensor 102F may measure the temperature and pressure of refrigerant as the refrigerant enters an inlet of the compressor 74 and send corresponding signals to the processor 86. Based on these signals, the processor 86 may determine the suction superheat, for example, using a look-up table that defines a relationship between an amount or degree of suction superheat and the temperature and pressure of the refrigerant as the refrigerant enters the compressor 74.

Additionally, certain embodiments of the refrigerant leak detection and mitigation system 99 may include additional sensors 102 that measure other properties and conditions of the HVAC unit 12 or the surrounding environment. For example, the embodiment of the refrigerant leak detection and mitigation system 99 illustrated in FIG. 5 includes temperature sensors 102G and 102H that are suitably positioned to measure different air temperatures that may be used in one or more of the determinations of one or more of the conditions of the vapor compression system 72 set forth above. The sensors 102G and 102H are communicatively coupled to the processor 86 of the control panel 82 and send signals to the processor 86 to indicate air temperatures at different locations. More specifically, the sensor 102G sends signals indicative of a temperature of environmental air 96, while the sensor 102H sends signals indicative of an air temperature within the HVAC unit 12, proximate to the vapor compression system 72. While the sensors 102A, 102B, 102C, 102D, 102E, 102F, 102G, and 102H are described in detail, any suitable sensors that detect operating conditions of the vapor compression system 72 relevant to refrigerant leakage may be used, in accordance with the present disclosure.

As described above, the processor 86 may determine or predict the presence of various conditions of the vapor compression system 72 based on data received from the sensors 102. As discussed, these vapor compression system conditions include icing of the evaporator 80, decreasing subcooling, and increasing superheat. The processor 86 may determine a probability that a refrigerant leak exists based on these conditions. More specifically, the processor 86 may weight each of these conditions based on the profile 100, which may be stored in the memory 88 of the control panel 82, or stored on another electronic device communicatively coupled to the control panel 82. Additionally, each of these conditions may be assigned a factor of severity. For example, Equation 1 below presents one possible manner of determining a probability of a leak existing in accordance with embodiments of the present disclosure.

$$P_{leak} = aF_{icing} + bF_{subcooling} + cF_{superheat} \qquad \text{Equation 1}$$

where: $P_{leak}$ is the probability of a leak existing; a, b, and c are weighting coefficients that sum to one and are each greater than zero; $F_{icing}$ is an icing factor that corresponds to the probability of icing being present on the evaporator 80 and has a value ranging from zero to one; $F_{subcooling}$ is a subcooling factor indicative of a degree of subcooling and has a value ranging from zero to one, wherein the lower the value of $F_{subcooling}$, the more subcooling present; and $F_{superheat}$ is a superheat factor that has a value ranging from zero to one, where the higher the value of $F_{superheat}$, the greater the amount of superheat.

The processor 86 may determine the icing factor ($F_{icing}$) by determining a probability of icing on the evaporator 80, as described above. For instance, the processor 86 may determine the probability of the icing based on signals from the sensors 102A, 102B, and 102C. A formula for determining the probability of icing may be stored on the memory 88 and implemented by the processor 86.

The processor 86 may determine the subcooling factor ($F_{subcooling}$) based on signals from the sensor 102D. For instance, an amount or degree of subcooling may be determined based on pressure and temperature data collected via the sensor 102D, as discussed above. The processor 86 may determine the subcooling factor by referencing the amount of subcooling to a look-up table included in the profile 100 or otherwise stored on the memory 88. Because the subcooling factor is ultimately tied into the probability of a refrigerant leak being present, higher amounts of subcooling correspond to lower values of the subcooling factor. That is, the greater the amount of subcooling present, the lower the probability of a refrigerant leak being present.

Additionally, the subcooling factor ($F_{subcooling}$) may be determined partially based on an air temperature sensed by sensor 102G or 102H. For example, at higher air temperatures, the degree of subcooling in the vapor compression system 72 may decrease without a refrigerant leak being present. Additionally, the HVAC unit 12 continues to supply conditioned air to a conditioned space, such as building 10, even though the amount of subcooling is relatively lower at the higher outdoor temperature. A look-up table, such as the look-up table described above, may be accessed by the processor 86 to determine the subcooling factor based on an air temperature in conjunction with a temperature and/or pressure of the refrigerant between the condenser 76 and the expansion valve 78.

The processor 86 may also determine the superheat factor ($F_{superheat}$) based on signals from the sensor 102E. As described above, the processor 86 may determine an amount or degree of superheat value based on temperature and pressure data received via the sensor 102E. The processor 86 may determine the superheat factor by comparing the amount of superheat with a look-up table included within the profile 100 or stored on the memory 88. A relatively high superheat compared to typical operation of the HVAC unit 12 would result in a higher value for the superheat factor. That is, the greater the amount of superheat present, the greater the probability of a refrigerant leak being present.

As described above, in certain embodiments, the sensor 102F that measures refrigerant flowing into the compressor 74 may collect data that the processor 86 can use to determine suction superheat. For instance, the processor 86 may determine the superheat factor by comparing the amount of suction superheat, as determined based on data from the sensor 102F, with a look-up table included within the profile 100 or stored on the memory 88. In other words, the superheat factor ($F_{superheat}$) may be determined by the processor 86 based on an amount of discharge superheat, an amount of suction superheat, or a combination thereof.

The subcooling factor and superheat factor may be determined in some cases by comparing the determined amounts of subcooling and superheat to respective predetermined threshold values. For example, due to the inverse relationship between subcooling and refrigerant leaks, when the amount of subcooling is above a predetermined threshold value, the subcooling factor ($F_{subcooling}$) may be assigned a zero or a near-zero value. That is, when the refrigerant is cooled to a temperature lower than the boiling point of the refrigerant and below the predetermined threshold value, the subcooling factor may be assigned a zero or a near-zero value. Similarly, when the amount of superheat is below a predetermined threshold value, the superheat factor ($F_{superheat}$) may be assigned a zero or a near-zero value.

The processor 86 may determine a refrigerant leak exists when the probability of a refrigerant leak is greater than a predetermined threshold value. For example, the predetermined threshold value may be a value stored on the memory 88. When the processor 86 determines that the predetermined threshold value has been exceeded, the processor 86 may send one or more signals to change one or more operations of the HVAC unit 12. For example, the processor 86 may send a signal to adjust a damper 107 to change an amount of environmental air 96 that enters the HVAC unit 12. As another example, the processor 86 may send a signal to a motor 108 that drives a supply fan 109 to operate at a different speed, such as a faster speed. That is, the processor 86 may send a signal to alter an amount of supply air 98 that is delivered to the building 10. For example, in certain embodiments, the supply fan 109 may be a variable speed fan that is operated at a speed proportional to the determined probability of a refrigerant leak existing. That is, the higher the probability of a refrigerant leak being present, the faster the supply fan 109 is operated, and thus, the more supply air 98 delivered to the building 10. As yet another example, the refrigerant may be pumped by the compressor 74 into a particular portion of the vapor compression system 72 to reduce a potential for continued refrigerant leakage within a certain portion of the HVAC system or building 10. For instance, the refrigerant may be pumped into a portion of the vapor compression system 72 that is located within the outdoor HVAC unit 58 of FIG. 3 to reduce a risk of refrigerant leakage within the indoor unit 56 of FIG. 3.

In addition to the actions described above, the processor 86 may send a signal to activate an alarm system in the building 10 and/or otherwise indicate that a refrigerant leak is present. For instance, the processor 86 may be send signals to a transceiver 110 that can transmit data to, and receive data from, a network 112. Via the network 112, the processor 86 may send signals to cause notifications and/or alarms on other electronic devices 114, which may include computers, tablets, phones, or other electronic devices. For example, the electronic devices 114 may receive emails, phone calls, text messages, or other forms of notifications based on signals sent from the processor 86.

With the foregoing in mind, it should be noted that Equation 1 is provided as an example of an equation that may be used to determine a probability of a refrigerant leak. However, whether a refrigerant leak exists may be determined by the processor 86 by utilizing an algorithm that includes other equations and/or limitations other than Equation 1. For example, when certain conditions are met, the processor 86 may determine that a refrigerant leak exists even though the probability of a leak existing may not surpass a predetermined threshold value. For instance, predetermined threshold values may be associated with the icing factor, the subcooling factor, and the superheat factor. When one or more of those predetermined threshold values are surpassed, the processor 86 may send one or more signals to change one or more operations of the HVAC unit 12 and/or activate an alarm, as described above.

As another example, the probability of a refrigerant leak existing may be determined based on two of icing, subcooling, and superheat. For example, an equation similar to Equation 1 that only includes two of the icing factor, subcooling factor, and superheat factor and the two respective weighting coefficients—that is, two of a, b, and c—may be used to determine the probability of a leak. In such a case, the processor 86 may compare the probability to a threshold value, as described above, to determine whether a leak exists.

Additionally, the processor 86 may monitor data from the sensors 102 over time and send signals to alter operation of the HVAC unit 12 and/or cause notification actions to be taken based on the changes in the conditions of the vapor compression system 72 over time. For example, at one time, the processor 86 may determine, based on data from the sensors 102, that the probability of a refrigerant leak has a first value, and send signals to open the damper 107 and/or adjust the speed of the motor 108. At a second time, the processor 86 may receive signals from the sensors 102 and determine that the probability of a refrigerant leak then has a second, higher value, indicating an increase in the probability of a refrigerant leak. In response to the higher or increasing probability, the processor 86 may send signals to further adjust the operation of the HVAC unit, enabling a variable response to the refrigeration leak according to leak severity. Other escalating response actions may include further opening the damper 107 and/or operating the motor 108 at an even faster speed to drive more supply air 98 into the building 10. Furthermore, an alarm may grow in intensity in response to higher refrigerant leak probabilities. For instance, an alarm may increase in volume or brightness. Additionally, notifications may be sent at a higher rate or the type of notification may change. For example, for one probability, an email may be sent, whereas for another probability, a text message may be sent or an automated phone call may be placed in addition, or in the alternative, to the email. In other words, the processor 86 may cause changes in operation that correspond to a particular probability value. However, it in some cases, no action may be taken by the processor 86 until the probability of a refrigerant leak exceeds a predetermined threshold value.

The processor 86 receives data from the sensors 102 over time and sends signals to perform various actions when the probability of a refrigerant leak existing increases towards a predetermined threshold value. In other words, the processor 86 may monitor changes in the probability of a refrigerant leak existing and determine whether the changes are indicative of the predetermined threshold value being exceeded at a future time. The closer the probability becomes to the predetermined threshold value, such as a predetermined tolerance of the threshold value, the greater the amount or degree of response of the processor 86 may become. For instance, as described above, the supply fan 109 may be operated at faster speeds and/or the damper 107 may be opened to further extents. However, in certain embodiments, when the predetermined threshold value is exceeded, the processor 86 sends a signal to stop operation of the HVAC unit 12 and/or pump the refrigerant into a specific portion of the vapor compression system 72. Additionally, upon recognizing that a predetermined threshold value is being approached or likely to be exceeded, the processor 86 may send signals to notify a person of such a determination. For instance, as described above, a notification may be sent in the form of an email or text message, among other suitable methods.

Alternatively, a series of predetermined threshold values may be used. For example, several predetermined threshold values relating to a probability of a refrigerant leak may be stored in the profile 100 or memory 88, and each predetermined threshold value may be associated with an action to be performed in response to the probability exceeding a respective predetermined threshold value. For instance, a first predetermined threshold value may correspond to a first probability value. When the first predetermined threshold value is exceeded, the processor 86 may send a signal to open the damper 107 to a partially opened position and/or modify a speed of the supply fan 109. A second predetermined threshold value corresponds to a higher probability than the first predetermined threshold value. When the second predetermined threshold value is exceeded, the processor 86 may send signal to open the damper 107 to a position that is more open than the position associated with the first predetermined threshold value. Additionally, the processor 86 may send a signal for the supply fan 109 to operate at a speed that is faster than the speed associated with the first predetermined threshold value. In other words, as predetermined threshold values associated with higher probabilities of a refrigerant leak being present are surpassed, the processor 86 may send signals to alter operation of the HVAC unit to a greater degree.

Furthermore, each of the predetermined threshold values and look-up tables discussed above may be determined experimentally via a test HVAC unit substantially similar to the HVAC unit 12. Using this test HVAC unit, experiments are performed in which leaks are intentionally generated, and resulting conditions of the vapor compression system are monitored via sensors similar to the sensors 102 to determine values stored in the look-up tables, as well as particular threshold values. More specifically, predetermined threshold values may be based on experimental simulations of the HVAC unit 12 that determine vapor compression system conditions and expected HVAC parameters, such as particular pressures, temperatures, and ice levels in the vapor compression system 72, when refrigerant leaks occur in different portions of the vapor compression system 72. Moreover, the coefficients a, b, and c of Equation 1 may be determined based on similar experimentation.

Figure 6:
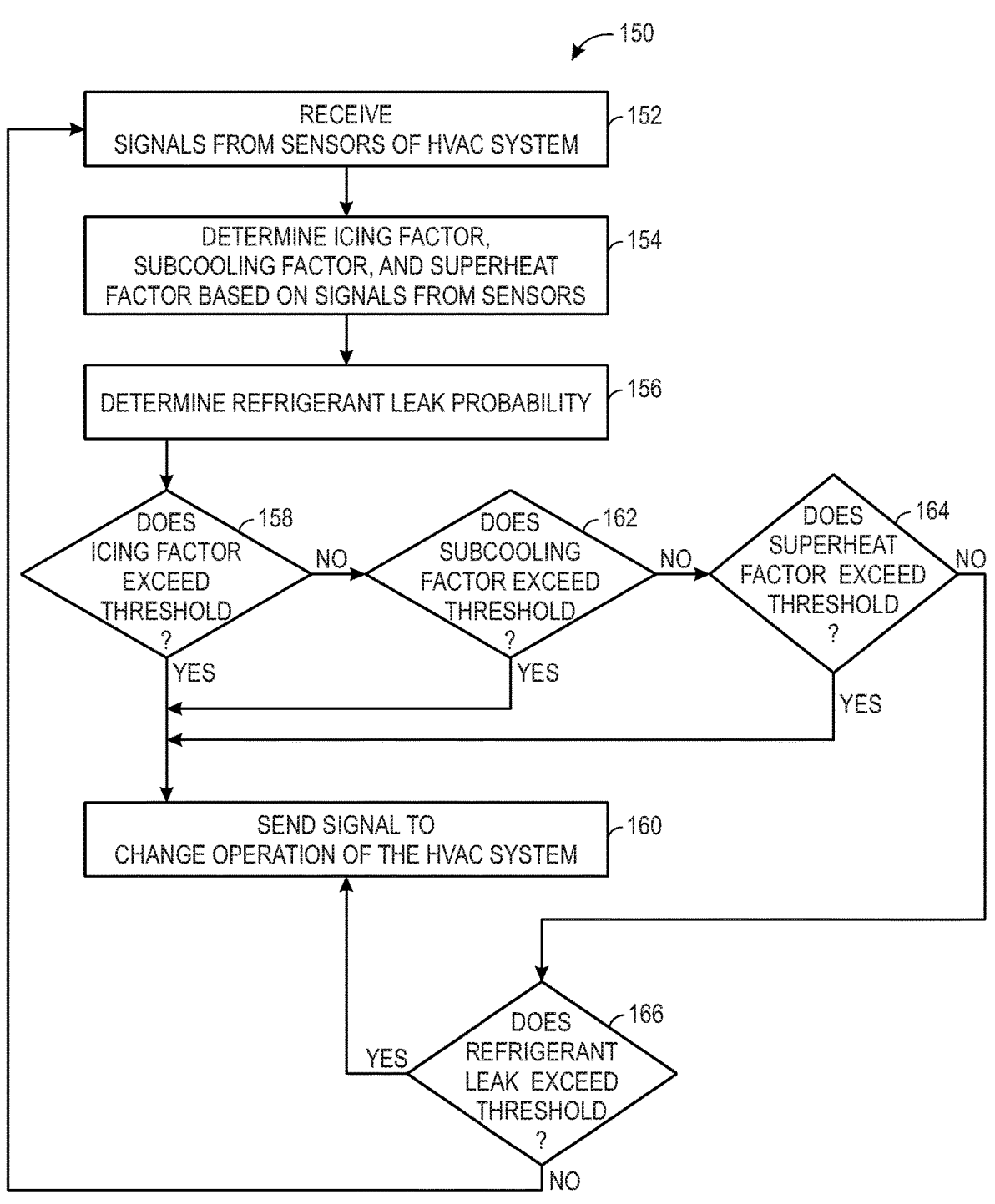
FIG. 6 is a flow diagram of a process for determining whether a refrigerant leak exists in the HVAC system and controlling the HVAC system based on such a determination, in accordance with embodiments described herein.

Keeping the discussion of FIG. 5 in mind, FIG. 6 is a flow diagram of an embodiment of a process 150 whereby the refrigerant leak detection and mitigation system 99 of the HVAC unit 12 determines whether a refrigerant leak is present in the vapor compression system 72 and controls operation of the HVAC unit 12 based on such a determination. The process 150 may be performed by the processor 86 by executing instructions stored on the memory 88, or other suitable processing circuitry, in accordance with the present disclosure.

At block 152, the processor 86 receives signals from sensors 102 of the refrigerant leak detection and mitigation system 99 of the HVAC unit 12. As described above, the sensors 102 may include sensors 102 that send signals regarding pressures and temperatures of refrigerant at various portions of the vapor compression system 72. Additionally, the sensors 102 may include sensor 102C that can detect the presence or amount of ice on the evaporator 80. The sensors 102 may also include sensors 102G, 102H that can measure different air temperatures, as discussed above.

At block 154, the processor 86 determines the icing factor, subcooling factor, and superheat factor based on the signals received from the sensors 102. For example, as described above, the icing factor may be based on signals received from sensors 102A, 102B, and 102C. The subcooling factor may be determined based signals from the sensor 102D, alone or in combination with signals from one or both of the sensors 102G and 102H. Additionally, the superheat factor may be determined based on a signal received from the sensor 102E and/or the sensor 102F. Each of these factors corresponds to a probability of a refrigerant leak being present. In other words, the higher the value of a given factor, the higher the probability or likelihood that a refrigerant leak is present.

At block 156, the processor 86 determines a refrigerant leak probability. That is, the processor 86 may determine how likely it is that a refrigerant leak exists. As explained above in relation to Equation 1, in certain embodiments, the probability of a refrigerant leak existing may be determined based on the value of the icing factor, subcooling factor, and superheat factor.

Each of the icing factor, subcooling factor, and superheat factor may be associated with respective predetermined threshold values. The predetermined threshold values may be stored as part of the profile 100 or elsewhere on the memory 88. At block 158, the processor 86 may determine whether the icing factor exceeds an icing factor threshold value. When icing factor exceeds the icing factor threshold value, the processor 86 sends a signal to change operation of the HVAC system, as indicated in block 160. For example, as described above, the processor 86 may send a signal to cause damper 107 to open or close to a certain position. The processor 86 may also send a signal to change a speed at which the supply fan 109 sends air to the building 10.

However, if the processor 86 determines that the icing factor does not exceed the icing factor threshold value, the processor 86 determines whether the subcooling factor exceeds a subcooling factor threshold value, as indicated in block 162. If the processor 86 determines that the subcooling factor exceeds the subcooling factor threshold value, the processor 86 may send a signal to alter operation of the HVAC system, as indicated in block 160. However, when the processor 86 determines that the subcooling factor does not exceed the subcooling factor threshold value, the processor 86 may determine whether the superheat factor exceeds a superheat threshold value, as indicated in block 164. When the superheat threshold value is exceeded, the processor 86 sends a signal to change operation of the HVAC system, as described above with relation to block 160.

When the processor 86 determines that the superheat does not exceed the superheat threshold value, the processor 86 determines whether the refrigerant leak probability exceeds a threshold associated with the refrigerant leak probability, as indicated in block 166. Such a threshold value may also be stored as part of the profile 100 or included within the memory 88. When the refrigerant leak probability exceeds the threshold value, the processor 86 sends a signal to alter operation of the HVAC system, as indicated in block 160. However, when the processor 86 determines that the refrigerant leak probability does not exceed the threshold value, the processor 86 may proceed back to block 152, as illustrated, to continue to receive signals from the sensors 102.

In other embodiments of the process 150 may include other steps. For example, in addition to determining whether the icing factor, subcooling factor, and superheat factor each exceed predetermined threshold values, the processor 86 may determine whether a combination of any two of the icing factor, subcooling factor, and superheat factor exceeds a predetermined threshold value associated with such a combination. As with the other predetermined threshold values, threshold values associated with a combination of two of the icing factor, subcooling factor, and superheat factor may be stored on the memory 88 or included in the profile 100.

Figure 7:
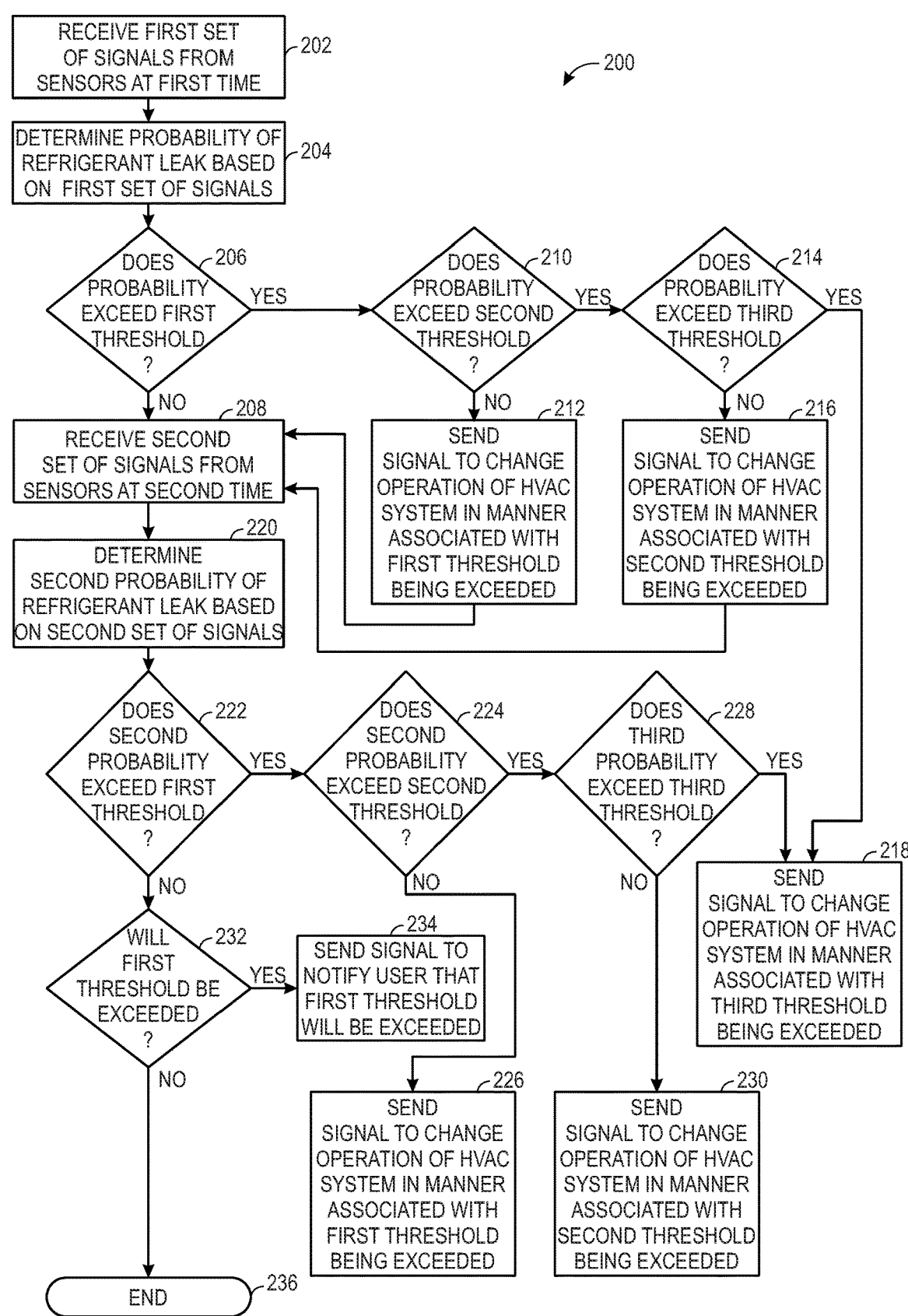
FIG. 7 is a flow diagram of a process for monitoring signals from sensors of the HVAC system over time to determine whether a refrigerant leak exists or predict whether a refrigerant leak will exist at a future time, in accordance with embodiments described herein.

The processor 86 of the refrigerant leak detection and mitigation system 99 may also monitor signals from the sensors 102 over time and make determinations based on those signals. FIG. 7 is a flow diagram of an embodiment of a process 200 whereby the refrigerant leak detection and mitigation system 99 may monitor signals from sensors 102 over time to determine whether a refrigerant leak exists or may exist at a future time. The process 200 may be performed by the processor 86 by executing instructions stored in the memory 88, or other suitable memory circuitry, in accordance with the present disclosure.

For the illustrated embodiment of the process 200, the processor 86 receives a first set of signals from sensors 102 at a first time, as indicated in block 202. As discussed above, the sensors 102 may collect data regarding conditions of the vapor compression system 72, such as temperatures and pressures of a refrigerant at various portions of the vapor compression system 72. The sensors 102 may also collect data regarding icing of the evaporator 80 and/or air temperatures. Subsequently, the processor 86 may determine a probability of a refrigerant leak existing based on the first set of signals, as indicated in block 204. In certain embodiments, the probability may be determined as described above.

Continuing thought the illustrated process 200, the processor 86 determines whether the probability exceeds a first threshold value, as indicated in block 206. The first threshold value, as well as the other threshold values described below in relation to the process 200, may be stored in the memory 88. When the processor 86 determines that the probability does not exceed the first threshold value, the processor 86 receives a second set of signals from the sensors 102 at a second time that occurs after the first time, as indicated in block 208.

However, the processor 86 determines that the probability exceeds the first threshold value, the processor 86 determines whether the probability exceeds a second threshold value that corresponds to a value that is greater than the first threshold value, as indicated in block 210. If the processor 86 determines that the probability does not exceed the second threshold value, then the processor 86 sends a signal to change an operation of the HVAC system in a manner that is associated with the first threshold value being exceeded, as indicated at block 212. For example, the profile 100 may include instructions regarding how the HVAC system should operate when the first threshold is exceeded, and the processor 86 may send a signal for the HVAC system to operate in that manner. For example, the damper 107 may be adjusted to a first position or the supply fan 109 may be commanded to operate at a first speed.

If the processor 86 determines that the probability exceeds the second threshold value, then the processor 86 determines whether the probability exceeds a third threshold value that is greater than the second threshold value, as indicated in block 214. If the processor 86 determines that the probability does not exceed the third threshold, then the processor 86 sends a signal to change an operation of the HVAC system in a manner that is associated with the second threshold being exceeded, as indicated in block 216. For instance, the profile 100 may include instructions regarding how the HVAC system should be operated when the second threshold value is exceeded, and the processor 86 may send a signal for the HVAC system to operate accordingly. For instance, the second threshold value may be associated with a second damper position that is further open that the first position. As another example, a second operating speed of the supply fan 109 associated with the second threshold value may be higher than the first speed.

However, if the processor 86 determines that the probability exceeds the third threshold value, then the processor 86 sends a signal to change an operation of the HVAC system in a manner that is associated with the third threshold value being exceeded, as indicated in block 218. For example, the profile 100 may include instructions that cause the vapor compression system 72 or HVAC system to be shut down. The instructions may also include pumping the refrigerant into a specific portion of the vapor compression system 72. Furthermore, in other embodiments, the instructions may include operating the supply fan 109 at a third speed that is faster than the second speed and/or opening the damper 107 to a third position that is further open than the second position. The processor 86 may send a signal to cause the HVAC unit 12 to operate in such a manner as indicated by the instructions that are included in the profile 100.

When the processor 86 sends signals to change an operation of the HVAC unit in a manner associated with the first or second threshold value, the processor 86 may also receive the second set of signals at the second time, as indicated by block 208. At block 220, the processor 86 may determine a second probability of a refrigerant leak existing based on the second set of signals. That is, the processor 86 may determine a new probability associated with data collected by sensors 102 at a time that occurs after the first set of data was collected.

The processor 86 may determine whether the second probability exceeds the first threshold value, as indicated by block 222. When it does, the processor 86, the processor 86 may determine whether the second probability exceeds the second threshold value, as indicated in block 224. As with block 212, in at block 226, the processor 86 sends a signal to operate the HVAC system in a manner associated with the first threshold value being exceeded when the processor 86 determines that the second probability does not exceed the second threshold value.

However, when the processor 86 determines that the second probability exceeds the second threshold value, the processor 86 determines whether the second probability exceeds the third threshold, as indicated in block 228. If the processor 86 determines that the second probability does not exceed the third threshold, the processor 86 sends a signal to change operation of the HVAC system in a manner that is associated with the second threshold value being exceeded, as indicated in block 230. Conversely, when the processor 86 determines that the second probability exceeds the third threshold, the processor 86 sends a signal to change operation of the HVAC system in a manner associated with the third threshold being exceeded, as indicated in block 218.

Returning to block 222, if the processor 86 determines that the second probability does not exceed the first threshold value, then the processor 86 may determine whether the first threshold value will likely be exceeded at a future time, as indicated in at block 232. The profile 100 may include instructions that may be executed by the processor 86 to make such a determination. For example, a rate of change in the probability of a refrigerant leak may be determined by determining a difference between the second probability and the probability and dividing that difference by the amount of time that passed between the first and second times. Future probabilities may then be extrapolated based on the determined rate of change.

If the processor 86 determines that the first threshold value will be exceeded, the processor 86 may send a signal to notify a user of the HVAC system or another person, as indicated in block 234. For example, as explained above, an email notification or text message, among other forms of notifications, may be generated and sent to various electronic devices. If the processor 86 determines that the first threshold value will not be exceeded, the processor 86 may terminate the process 200, as indicated in block 236.

While only certain features and embodiments of the present disclosure have been illustrated and described, many modifications and changes may occur to those skilled in the art without materially departing from the novel teachings and advantages of the subject matter recited in the claims. For instance, the modifications and changes may include variations in sizes, dimensions, structures, shapes and proportions of the various elements, values of parameters such as temperatures or pressures, mounting arrangements, use of materials, colors, orientations, and the like. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A refrigerant leak detection and mitigation system of a heating, ventilating, and air conditioning (HVAC) unit, comprising a controller configured to:

determine respective values associated with a plurality of parameters of the HVAC unit based on data from a plurality of sensors, wherein the plurality of parameters comprises a presence of ice formed on a surface of an evaporator of the HVAC unit, and the plurality of sensors comprises an ice sensor configured to detect ice formed on the surface of the evaporator;

calculate a weighted value indicative of a refrigerant leak in the HVAC unit based on each of the respective values associated with the plurality of parameters; and provide a control signal to modify operation of the HVAC unit in response to a comparison of the weighted value with a threshold value.

2. The refrigerant leak detection and mitigation system of claim 1, wherein the plurality of parameters comprises an amount that a liquid refrigerant temperature is below a refrigerant boiling point.

3. The refrigerant leak detection and mitigation system of claim 1, wherein the plurality of parameters comprises an amount of superheat.

4. The refrigerant leak detection and mitigation system of claim 1, wherein the controller is configured to calculate the weighted value indicative of the refrigerant leak based on a measured amount of ice on the surface of the evaporator, a measured amount of subcooling, and a measured amount of superheat.

5. The refrigerant leak detection and mitigation system of claim 1, wherein the ice sensor comprises a pressure sensor and a temperature sensor disposed between the evaporator and a compressor of the HVAC unit.

6. The refrigerant leak detection and mitigation system of claim 5, wherein the controller is configured to:

receive a pressure signal from the pressure sensor and a temperature signal from the temperature sensor, wherein the pressure signal and the temperature signal are indicative of a pressure and a temperature, respectively, of a refrigerant between the evaporator and the compressor of the HVAC unit; and predict a respective value associated with an amount of ice based on the pressure signal and the temperature signal.

7. The refrigerant leak detection and mitigation system of claim 6, wherein the pressure sensor and the temperature sensor are disposed at a refrigerant outlet of the evaporator.

8. The refrigerant leak detection and mitigation system of claim 7, wherein the pressure sensor and the temperature sensor are integrated into a single body of a combination pressure temperature sensor.

9. The refrigerant leak detection and mitigation system of claim 1, wherein the surface of the evaporator is an outer surface of the evaporator, the ice sensor is disposed on the outer surface of the evaporator of the HVAC unit, and the controller is configured to determine a respective value associated with an amount of ice on the outer surface of the evaporator based on data from the ice sensor.

10. The refrigerant leak detection and mitigation system of claim 1, wherein the plurality of parameters comprises an amount of subcooling, the refrigerant leak detection and mitigation system comprises a pressure sensor and a temperature sensor disposed between a condenser and an expansion device of the HVAC unit, and the controller is configured to determine a respective value associated with the amount of subcooling based on signals received from the pressure sensor and the temperature sensor.

11. The refrigerant leak detection and mitigation system of claim 1, wherein the plurality of parameters comprises an amount of superheat, the refrigerant leak detection and mitigation system comprises a pressure sensor and a temperature sensor disposed between a compressor and a condenser of the HVAC unit, and the controller is configured to determine a respective value associated with the amount of superheat based on signals received from the pressure sensor and the temperature sensor.

12. The refrigerant leak detection and mitigation system of claim 1, wherein the plurality of parameters comprises an air temperature, and the controller is configured to determine a respective value associated with the air temperature based on data from an air temperature sensor.

13. The refrigerant leak detection and mitigation system of claim 1, wherein the controller is configured to provide the control signal to adjust a position of a damper to allow environmental air into the HVAC unit in response to the weighted value exceeding the threshold value.

14. The refrigerant leak detection and mitigation system of claim 1, wherein the controller is configured to provide the control signal to adjust a speed of a supply fan to increase airflow through the HVAC unit in response to the weighted value exceeding the threshold value.

15. The refrigerant leak detection and mitigation system of claim 1, wherein the controller is configured to provide the control signal to deactivate the HVAC unit in response to the weighted value exceeding the threshold value.

16. The refrigerant leak detection and mitigation system of claim 1, wherein the controller is configured to provide the control signal to adjust a speed of a variable speed supply fan proportional to the weighted value.

17. A heating, ventilating, and air conditioning (HVAC) system having a condenser, an expansion device, an evaporator, and a compressor fluidly coupled to form a vapor compression system, wherein the HVAC system includes a refrigerant leak detection and mitigation system, comprising:

icing sensors, subcooling sensors, and superheat sensors communicatively coupled to a controller that is configured to:

determine an amount of icing, an amount of subcooling, and an amount of superheat based on measurements from the icing sensors, subcooling sensors, and superheat sensors, respectively;

determine a weighted calculation indicative of a refrigerant leak in the vapor compression system based on the amount of icing, the amount of subcooling, and the amount of superheat; and provide a control signal to modify operation of the HVAC system in response to the weighted calculation exceeding a threshold value.

18. The HVAC system of claim 17, wherein the controller is configured to determine the weighted calculation indicative of the refrigerant leak using an equation that mathematically associates the weighted calculation with the amount of icing, the amount of subcooling, and the amount of superheat.

19. The HVAC system of claim 17, wherein the icing sensors comprise a pressure sensor and a temperature sensor disposed at a refrigerant outlet of the evaporator, and wherein the controller is configured to:

receive respective signals from the pressure sensor and the temperature sensor indicating a pressure and a temperature, respectively, of refrigerant in the vapor compression system between the evaporator and the compressor; and determine the amount of icing based on the respective signals received from the pressure sensor and the temperature sensor.

20. The HVAC system of claim 17, wherein the icing sensors comprise an ice sensor disposed on an outer surface of the evaporator, and wherein the controller is configured to determine the amount of icing based on a signal received from the ice sensor.

21. The HVAC system of claim 17, wherein the subcooling sensors comprise a pressure sensor and a temperature sensor disposed at a refrigerant outlet of the condenser, and wherein the controller is configured to determine the amount of subcooling based on signals received from the pressure sensor and the temperature sensor.

22. The HVAC system of claim 17, comprising an air temperature sensor communicatively coupled to the controller, wherein the controller is configured to:

determine an air temperature based on signals received from the air temperature sensor; and determine the amount of subcooling based on the air temperature.

23. The HVAC system of claim 17, wherein the superheat sensors comprise a pressure sensor and a temperature sensor disposed at a refrigerant outlet of the compressor, and wherein the controller is configured to:

receive respective signals from the pressure sensor and the temperature sensor indicating a pressure and a temperature of refrigerant in the vapor compression system between the compressor and the condenser;

determine an amount of discharge superheat based on the respective signals received from the pressure sensor and the temperature sensor; and determine the amount of superheat based on the amount of discharge superheat.

24. The HVAC system of claim 17, comprising an air temperature sensor communicatively coupled to the controller, wherein the controller is configured to:

receive signals from the air temperature sensor indicating an air temperature;

determine the air temperature based on the signals received from the air temperature sensor; and determine the amount of superheat based on the air temperature.

25. The HVAC system of claim 17, wherein the controller is configured to provide the control signal to adjust a position of a damper to allow fresh air into the HVAC system and adjust a speed of a supply fan to increase airflow through the HVAC system in response to the weighted calculation exceeding the threshold value.

26. The HVAC system of claim 17, wherein the controller is configured to provide the control signal to send an email, text message, or phone call to an electronic device.

27. The HVAC system of claim 17, wherein the controller is configured to provide the control signal to adjust a speed of a variable speed supply fan proportional to the weighted calculation.

28. The HVAC system of claim 17, wherein the superheat sensors comprise a pressure sensor and a temperature sensor disposed at a refrigerant inlet of the compressor, and wherein the controller is configured to:

receive respective signals from the pressure sensor and the temperature sensor indicating a pressure and a temperature of refrigerant in the vapor compression system between the evaporator and the compressor;

determine an amount of suction superheat based on the respective signals received from the pressure sensor and the temperature sensor; and determine the amount of superheat based on the amount of suction superheat.

29. A heating, ventilating, and air conditioning (HVAC) system having a condenser, an expansion device, an evaporator, and a compressor fluidly coupled to form a vapor compression system, wherein the HVAC system includes a refrigerant leak detection and mitigation system, comprising:

icing sensors, subcooling sensors, and superheat sensors communicatively coupled to a controller that is configured to:

determine an icing value indicative of icing on the evaporator, a subcooling value, and a superheat value based on measurements from the icing sensors, subcooling sensors, and superheat sensors, respectively, wherein the subcooling value comprises an amount that a liquid refrigerant temperature is below a refrigerant boiling point;

calculate a weighted value indicative of a refrigerant leak in the vapor compression system based on the icing value, the subcooling value, and the superheat value; and provide a control signal to modify operation of the HVAC system in response to the weighted value exceeding a threshold value.

30. The HVAC system of claim 29, wherein the controller is configured to provide the control signal to adjust a speed of a variable speed supply fan proportional to the weighted value indicative of the refrigerant leak.

31. The HVAC system of claim 29, wherein the controller is configured to provide the control signal to modify operation of the HVAC system in response to the icing value exceeding an additional threshold value.

32. The HVAC system of claim 29, wherein the controller is configured to provide the control signal to modify operation of the HVAC system in response to the subcooling value exceeding an additional threshold value.

33. The HVAC system of claim 29, wherein the controller is configured to provide the control signal to modify operation of the HVAC system in response to the superheat value exceeding an additional threshold value.

34. The HVAC system of claim 29, wherein the weighted value comprises a weighted summation of the icing value, the subcooling value, and the superheat value.

35. The HVAC system of claim 29, wherein the icing value comprises an amount of ice formed on an outer surface of the evaporator.

* * * * *